(12) United States Patent
Heintz et al.

(10) Patent No.: US 9,775,058 B2
(45) Date of Patent: Sep. 26, 2017

(54) HOME SYSTEM FOR MANAGING AN INTERNET ACCESS CONNECTION

(75) Inventors: Bruno Heintz, Paris (FR); Jean Marc Oury, Paris (FR); Hugues Lefebvre De Saint Germain, Saint-Foy-les-Lyon (FR); Pierre Bivas, Le Vesinet (FR); Mathieu Bineau, Versailles (FR)

(73) Assignee: VOLTALIS, Paris (FR)

( * ) Notice: Subject to any disclaimer, the term of this patent is extended or adjusted under 35 U.S.C. 154(b) by 121 days.

(21) Appl. No.: 14/118,276

(22) PCT Filed: May 3, 2012

(86) PCT No.: PCT/FR2012/050979
§ 371 (c)(1),
(2), (4) Date: Feb. 6, 2014

(87) PCT Pub. No.: WO2012/160283
PCT Pub. Date: Nov. 29, 2012

(65) Prior Publication Data
US 2014/0185433 A1    Jul. 3, 2014

(30) Foreign Application Priority Data

May 26, 2011 (FR) .................................. 11 54572

(51) Int. Cl.
  *H04W 24/04*   (2009.01)
  *H04L 12/24*   (2006.01)
  *H04L 12/28*   (2006.01)
  *H04L 29/14*   (2006.01)

(52) U.S. Cl.
  CPC ......... *H04W 24/04* (2013.01); *H04L 12/2898* (2013.01); *H04L 41/0668* (2013.01); *H04L 69/40* (2013.01)

(58) Field of Classification Search
None
See application file for complete search history.

(56) References Cited

U.S. PATENT DOCUMENTS

| | | | |
|---|---|---|---|
| 6,628,754 B1 * | 9/2003 | Murphy | H04B 3/46 370/252 |
| 7,508,754 B1 * | 3/2009 | Sankaranaraynan et al. | 370/225 |
| 7,646,752 B1 * | 1/2010 | Periyalwar et al. | 370/338 |
| 7,756,544 B1 * | 7/2010 | Graham | 455/522 |
| 7,782,877 B2 * | 8/2010 | Durbin | H04L 45/04 370/219 |
| 2005/0086385 A1 | 4/2005 | Rouleau | |

(Continued)

OTHER PUBLICATIONS

Search Report Dated 2012.

*Primary Examiner* — Candal Elpenord
(74) *Attorney, Agent, or Firm* — Ipsilon USA, LLP

(57) ABSTRACT

A home system for managing an internet network (9) access connection in which at least one computer (80) can access the internet by way of a main home connection (8). The system contains software means (83) capable of detecting a failure to connect to the internet network (9) on the main home connection (8) and of controlling an automatic failover to a back-up connection comprising a control box (5) of a system for the real-time measurement and modulation of the power consumption of a plurality of electrical appliances (2). The control box (5) is capable of accessing the internet network (9) by way of a wireless connection (6) of packet telephony type.

11 Claims, 1 Drawing Sheet

(56) References Cited

U.S. PATENT DOCUMENTS

2005/0174935 A1\* 8/2005 Segel ................ H04L 45/22
                                              370/228
2009/0245102 A1   10/2009 Feng
2011/0251807 A1\* 10/2011 Rada ................ G01D 4/00
                                              702/61

\* cited by examiner

HOME SYSTEM FOR MANAGING AN INTERNET ACCESS CONNECTION

RELATED APPLICATIONS

This application is a National Phase Application of PCT/FR2012/050979, filed on May 3, 2012, which in turn claims the benefit of priority from French Patent Application No. 11 54572 filed on May 26, 2011, the entirety of which are incorporated herein by reference.

BACKGROUND

Field of the Invention

The present invention relates to a home system for managing an internet network access connection.

Description of Related Art

Today, a very great majority of households in developed countries own equipment for connecting to the internet at home, and more and more services of modern life, such as telephony, television reception, information searching, online purchases or even administrative procedures, depend directly on the reliability of this internet connection.

However, access interruptions or breakdowns of the equipment used for the connection (ADSL modems, routers, operator network etc.) or of the cables connecting the equipment remain frequent, of the order of several days a year, with increasingly serious consequences for the comfort of users.

Certain access providers have already proposed to provide their clients with a 3G key that can act as relay when the ADSL modem/router box to which the home PC is linked fails in its attempts to connect no the internet. In practice, the user must first declare to his access provider that there is a connection problem, then plug this key into a USB port provided for this purpose on the corresponding modem/router box equipping his home. Internet access can then be carried out by a 3G connection made possible by a 3G modem incorporated into this key.

This procedure exhibits a certain number of drawbacks. First of all, it is not automatic since the user must himself connect the 3G key on his modem/router box when he encounters a connection problem. Furthermore, the fact that the user must previously declare a connection problem via his main access network can pose a problem, notably if the breakdown deprives the user of all outside access from their home (telephone communications and internet simultaneously interrupted). Moreover, the time allocated by the access provider for internet sessions using the 3G key as a relay is generally limited to a connection credit equivalent to an amount of data bytes. Moreover, the 3G key being assigned to the same access provider as the modem/router box, it cannot act as back-up connection in cases where the connection failure is due to a problem on the server of the access provider. Finally, this solution only applies to home network architectures in which a PC is connected to a modem/router box allowing access to the internet. Thus, the 3G key used as a relay does not make it possible to solve connection problems encountered by other home architectures, such as a direct connection by a PC equipped with an on-board ADSL modem.

OBJECTS AND SUMMARY

There is thus a real need to find a permanent solution that will make it possible to give the user the possibility of accessing the internet in the event of problems being encountered on his main home connection, in a transparent and automatic manner that is also easy to implement whatever the architecture of the main home connection.

The present invention starts from the observation that many households are also equipped with other communication systems containing at least one device or box capable of communicating with the outside by its own internet connection.

In particular, the Applicant has developed a system for the real-time measurement and modulation of the power consumption of a plurality of electrical appliances, the principle of which is notably described in the document WO 2088/017754, and the main elements of which are shown schematically in FIG. 1. This measurement system contains at least one modulator box 1 to which several electrical appliances 2 (such as water heaters, electric radiators, air conditioning etc.) may be connected individually or in series on current loops. The modulator box 1 is capable of measuring in real time the voltages and currents consumed by these electrical appliances 2, and of periodically sending the measurements to an external platform 3 hosted by an internet server, every ten minutes for example. This periodic sending of measurements is carried out by way of a wireless communication modem 4 incorporated into a control box 5 of the system, the wireless communication modem 4 allowing a connection 6 to the internet platform 3 of packet telephony type, such as GPRS, 3G or 4G. The control box 5 is preferably separate from the modulator box 1 and connected to the latter by a wired link 7, preferably by carrier current or PLC. To do this, each of the modulator box 1 and control box 5 is equipped with a PLC modem (not shown). The control box 5 can thus be linked to a plurality of modulator boxes 1 from which it collects the measurements for sending to the external platform 3. The control box 5 advantageously contains a USB port (not shown), which makes it possible to allow the connection of additional modules such as short-range radio modems. Thus, provision can also be made for the transmission of measurements from the modulator boxes 1 to be carried out via this radiofrequency path. The measurements received by the external platform 3 are stored and can be viewed at any moment and from any place by the user, who can connect to his user space on the internet by any known means. The platform 3 is furthermore able to send to the control box 5, by the wireless connection 6 of packet telephony type, orders for controlling the interruption of the power supply of all or part of the electrical appliances 2 connected to the various modulator boxes 1 for a predetermined duration. The periods of interruptions are generally less than half an hour, so that users affected by the interruptions of all or part of their electrical appliances, such as heating or air-conditioning, do not suffer any nuisance. The interruption of the power supply is carried out by way of the modulator boxes 1. Using this system, and furthermore the possibility of monitoring the consumption by each user, it is possible to simultaneously manage a large quantity of modulator boxes 1 and control boxes 5 at the level of the centralized platform 3, and to modulate more easily, and on a community-wide, departmental or regional scale, the electrical power consumed by a set of users, particularly during peaks in consumption, without it being necessary for suppliers of electrical energy to produce more electricity.

Today, even if a home is equipped with, on the one hand, a system for connection to the internet, and on the other hand, a measurement and modulation system as described previously, these two systems coexist in the home but do not have any particular interaction.

The present invention proposes to cleverly combine these two systems to make it possible to offer a simple and automatic solution when a user faces a problem accessing the internet on his main connection.

More precisely, the subject of the present invention is a home system for managing an internet network access connection in which at least one computer can access the internet by way of a main home connection, characterized in that the system contains means capable of detecting a failure to connect to the internet on said main home connection, and of controlling an automatic failover to a back-up connection comprising a control box of a system for the real-time measurement and modulation of the power consumption of a plurality of electrical appliances, said control box being capable of accessing the internet network by way of a wireless connection of packet telephony type.

According to other preferred characterizing features for the implementation of the invention:

- the main home connection can be carried out by way of a modem box to which the computer is linked by a first communications link. The modem box can also be a data router;
- the modem box can be linked to the control box by way of a second communications link;
- the computer can be directly linked to said control box by way of a third communications link;
- the first communications link and/or the second communications link and/or the third communications link is of wired type, notably an Ethernet link or a link by power line carrier (PLC);
- as a variant, the first communications link and/or the second communications link and/or the third communications link is of short-range radiofrequency type, notably a WiFi or Bluetooth link;
- the wireless connection is of GPRS, 3G or 4G type.
- the detection and failover means are a software module stored in a memory of the computer, or in a memory of the modem box, or in a memory of the control box.

BRIEF DESCRIPTION OF THE DRAWINGS

Various aspects of the invention will appear in the following description, made with reference to the appended figures, in which.

DETAILED DESCRIPTION

In the rest of the description, elements common to both figures bear the same reference numbers.

Figure 2:
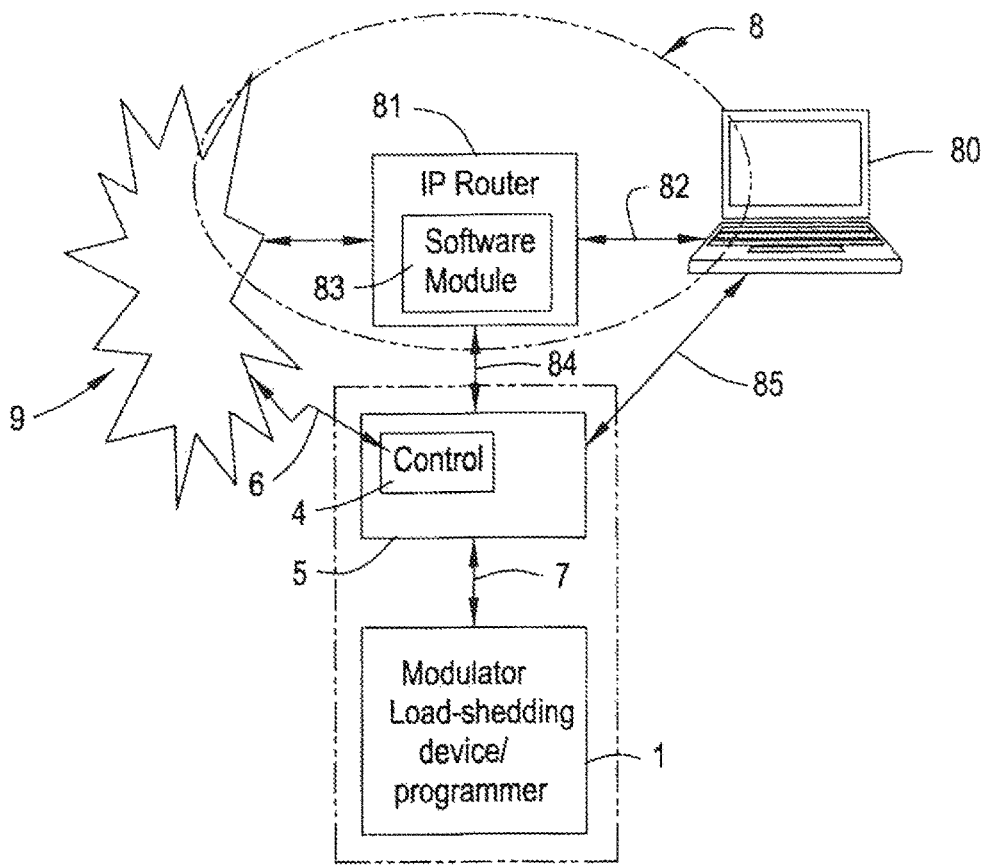
FIG. 2 schematically illustrates a home system for managing an internet network access connection according to a possible architecture in accordance with the invention.

In the appended FIG. 2, the reference 8 represents a set of items of equipment installed in the home of a user, enabling a connection to the internet network 9. This set corresponds no the main home connection of the user. In the example shown, this connection 8 allows the user to access the internet network 9 from his PC 80, by way of an ADSL or fiber optic modem 81 to which the computer 80 is connected. The link 82 between the computer 80 and the ADSL or fiber optic modem 81 can be of wired type, for example a link of Ethernet type by way of a RJ-45 cable, or of power line carrier type. As a variant, if the computer 80 and the ADSL modem so allow, the link 82 can be of short-range radiofrequency type, for example of WiFi or Bluetooth type. The ADSL modem 81 can advantageously have a router function so as to allow the simultaneous connection of a plurality of items of equipment (laptop or desktop PC, PDA, smart telephone equipment or tablets, television etc.) and offer a so-called "triple play" service comprising high-speed internet access, Voice over IP telephony and television.

Figure 1:
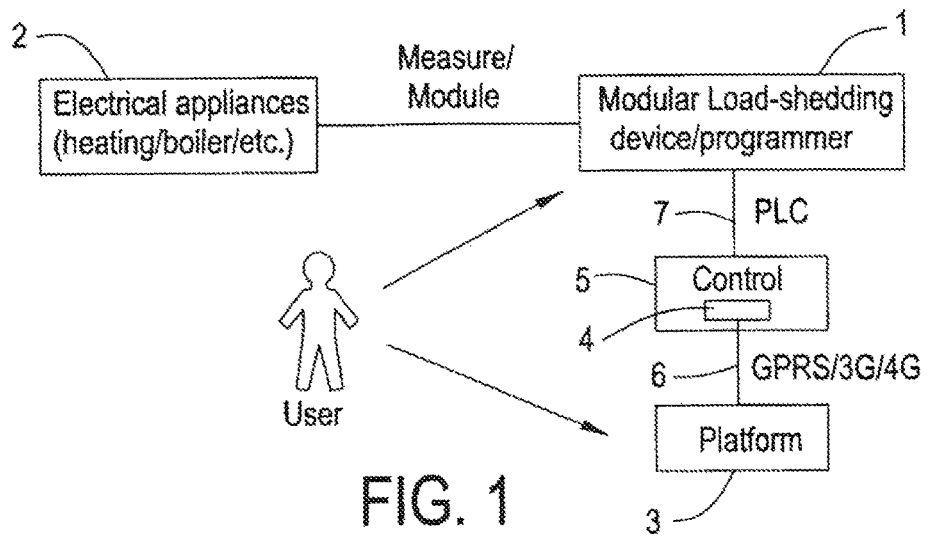
FIG. 1, described above, schematically shows a known system for the real-time measurement and modulation of a plurality of electrical appliances.

According to the invention, another component of the home system for managing an internet connection is the part of the items of equipment of the system for the real-time measurement and modulation of a plurality of electrical appliances, described previously, situated in the household of the user, and in particular the modulator box or boxes 1 (only one of which is shown in the figure) and the control box 5. As seen above, this control box 5 is endowed with a modem 4 allowing it to set up a wireless connection 6 of packet telephony type, according to a protocol such as GPRS, 3G or 4G, in the aim of transmitting measurement data to a centralized platform 3 (see FIG. 1) hosted by an internet server, and of receiving interruption commands. In such a system, the control box 1 is generally parameterized to allow only an automatic connection of the control box 5 to the centralized platform 3 at the time of the transmission of the measurement data, by using the wireless connection 6, and this in a way that is totally transparent to the user.

Here, and in accordance with the invention, the wireless connection 6 offered by the control box 5 will be used as back-up connection for access to the internet network 9 in the event of a fault on the main home connection 8. To do this, the management system of the invention contains means capable of detecting a failure to connect to the internet network 9 on the main home connection 8 and of controlling an automatic failover to the back-up connection 6. The means are typically a software module 83 stored in the memory of the modem 81, as illustrated in FIG. 2, so as to be loaded and executed by the microprocessor of this modem 81. The software module 83 can nonetheless be implemented at the level of the PC 80 and/or at the level of the control box 5.

Thus, in the architecture shown in FIG. 2, it is the modem 81, using the software module 83, that detects a failure to connect to the internet network 9 by the main home connection 8 by measuring the ADSL line or by detecting an absence of traffic on the connection at the end of a predetermined period following a connection attempt. In the event of a connection failure being detected, or of several unsuccessful connection attempts, the software module 83 then controls the failover of the connection to the back-up connection 6 offered by the control box 5. The modem 81 is advantageously linked to the control box 5 by way of a wired link 84, for example a link of Ethernet type by way of a RJ-45 cable, or of power line carrier type. As a variant, the link 84 is a short-range wireless link, of Bluetooth, ZigBee or WiFi type. For this type of architecture, the data between the PC 80 and the internet network 9 will then transit by the link 82, the modem 81, and the modem 6 of the control box 5.

As a variant or in parallel, the PC 80 can also be connected to the control box 5 by a link 85. Here again, the link 85 can be wired, for example a link of Ethernet type by way of a RJ-45 cable, or of power line carrier type. This is made possible by the fact that the control box is equipped with an Ethernet port and a PLC modem for its connection with the measurement boxes 1. The link 85 can also be a short-range wireless link, of Bluetooth, ZigBee or WiFi type. This is made possible by the fact that the control box 5 contains a USE port to which various radiofrequency modules can be connected.

It is also possible, as indicated above, that the software module 83 be loaded not into the router 81, but at the level of the PC 80. An implementation of the software module on the PC will be preferred to the extent that it makes it possible to avoid a possible breakdown at the router level. In this case, the data between the PC 80 and the internet network 9 will preferably transit by the direct link 85 between the PC and the control box 5. This solution will be adopted furthermore in all cases where the main internet access connection is carried out without the router modem 81, from a PC endowed with an on-board ADSL modem.

It is also possible to envisage that the software module 83 be placed at the level of the intelligence of the control box 5. In this case, the data between the PC 80 and the internet network 9 will then transit preferably by the direct link 85 between the PC and the control box 5, the latter choosing to direct them toward the router modem 81 if no problem of access by the main home connection is detected, or to instigate failover to the back-up connection 6 in the converse case.

By virtue of the invention, the user possesses a back-up connection which can be implemented very easily, whatever the initial architecture of his main connection.

Of course, the software module 83 can also be capable of controlling a new failover to the main home connection from the moment that the latter becomes operational again. As a variant, it will be necessary to await a new connection session to test the main connection again, and to automatically choose to access the internet by the main connection or by the back-up connection, according to the situation.

The invention claimed is:

1. Home system for managing an internet network access connection comprising:
    a first modem included in a main home connection to the internet network;
    at least one home computer capable of accessing the internet network through said first modem of said main home connection;
    a control box, having a second wireless communication modem, for use in a system that allows for the real-time measurement of voltages and currents consumed by a plurality of electrical appliances, and allows for receiving instructions for interrupting a power supply of all or part of said plurality of electrical appliances, said second wireless communication modem being capable of accessing the internet network by way of a wireless connection of packet telephony type through said second wireless communication modem, said control box being linked to said first modem of said main home connection and to said computer;
    a software module stored in a memory of any one of, or any combination thereof, the first modem, or the control box having the second wireless communication modem, or the computer, said software module capable of detecting a failure to access said internet network on said main home connection and of controlling an automatic failover to the second wireless communication modem of said control box as a back-up connection.

2. The home system for managing the internet network access connection according to claim 1, wherein the said first modem is a modem box to which the home computer is linked by a first communications link.

3. The home system for managing the internet network access connection according to claim 2, wherein said modem box is also a data router.

4. The home system for managing the internet network access connection according to claim 2, wherein said modem box is linked to the control box connected to said second modem by way of a second communications link.

5. The home system for managing the internet network access connection according to claim 4, wherein said home computer is directly linked to said control box connected to said second modem by a third communications link.

6. The home system for managing the internet network access connection according to claim 5, wherein said first communications link and/or said second communications link and/or said third communications link is of wired type.

7. The home system for managing the internet network access connection according to claim 2, wherein said first communications link and/or said second communications link and/or said third communications link is of short-range radiofrequency type.

8. The home system for managing the internet network access connection according to claim 1, said wireless connection is of GPRS, 3G or 4G type.

9. Home system for managing the internet network access connection according to claim 1, wherein said first modem is integrated within said home computer.

10. The home system for managing the internet network access connection according to claim 6, wherein said wired type of communications link(s) is an Ethernet link or a link by power line carrier.

11. The home system for managing the internet network access connection according to claim 7, wherein said communications link(s) is a WiFi or Bluetooth link.

* * * * *